Figure 1:
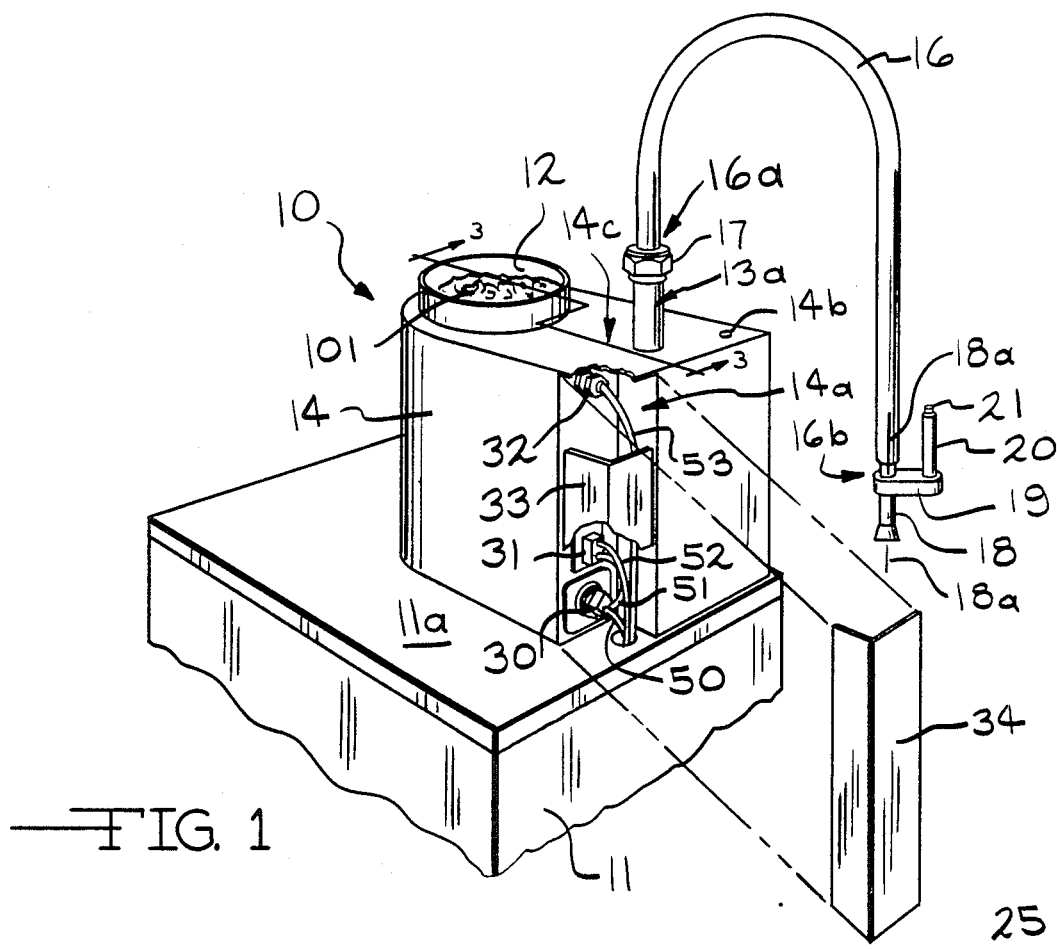

United States Patent [19]

Santa Cruz

[11] Patent Number: 4,762,060
[45] Date of Patent: Aug. 9, 1988

[54] APPARATUS FOR CONTROLLED HEATING AND DISPENSING OF A MIXED LIQUID AND SOLID MATERIAL

[76] Inventor: Arthur W. Santa Cruz, 430 Charles St., East Lansing, Mich. 48823

[21] Appl. No.: 85,626

[22] Filed: Aug. 14, 1987

[51] Int. Cl.⁴ .............................................. B05C 5/04
[52] U.S. Cl. ..................................... 99/483; 99/486; 99/516; 118/20; 118/25; 219/327; 219/441; 222/146.2
[58] Field of Search ...................... 99/329 R, 330, 331, 99/333, 352, 483, 485, 486, 516, 536; 118/20, 23–25; 222/129, 145, 146.1, 146.2; 366/149; 219/401, 471, 311, 324, 333, 385, 469, 471, 327, 328, 441

[56] References Cited

U.S. PATENT DOCUMENTS

| | | | |
|---|---|---|---|
| 3,601,088 | 8/1971 | Lacam | 118/20 X |
| 3,908,111 | 9/1975 | DuBois et al. | 219/433 X |
| 3,940,589 | 2/1976 | Tupper | 219/441 X |
| 4,061,083 | 12/1977 | Caliva | 118/24 X |
| 4,302,111 | 11/1981 | Harris | 99/483 X |
| 4,441,016 | 4/1984 | Oota et al. | 99/333 X |
| 4,478,140 | 10/1984 | Bullock | 99/330 X |
| 4,509,450 | 4/1985 | Jondahl | 99/483 |
| 4,534,283 | 8/1985 | Nakamuta | 99/516 X |
| 4,620,645 | 11/1986 | Hale | 222/146.2 |

Primary Examiner—Timothy F. Simone
Attorney, Agent, or Firm—Ian C. McLeod

[57] ABSTRACT

An apparatus (10) for heating a liquid and solid material 101 by means of water (100) in a jacket (14) around a reservoir 12 for the material is described. The temperature of the water is regulated by a thermostat (31) and a heater (30). A predetermined level (100a) of water is maintained by a switch (65) controlling a valve (37) from a source (36) of water. The heater only operates when the water is at the predetermined level and is controlled by sensor 32 connected to a double pole double throw switch 65. The apparatus is particularly adapted for dispensing bean paste or frijoles.

24 Claims, 4 Drawing Sheets

1

APPARATUS FOR CONTROLLED HEATING AND DISPENSING OF A MIXED LIQUID AND SOLID MATERIAL

BACKGROUND OF THE INVENTION

Summary of the Invention

The present invention relates to an apparatus for the controlled heating and dispensing of a mixed liquid and solid material or paste, especially a bean paste or frijoles. In particular the present invention relates to an apparatus wherein the material is subjected to controlled heating in an apparatus which is adapted for use in a restaurant kitchen, particularly where Mexican food is served with the frijoles.

PRIOR ART

U.S. Pat. No. 4,509,450 to Jondahl discloses a pump type device for dispensing heated cheese and it is assumed that this is easily accomplished. The heating means is not disclosed and it is assumed that this is easily accomplished. The problem is that many foods, like frijoles or cheese, are easily burned and are very difficult to keep warm. Direct heating of a container for these foods is undesirable. Using heated water around a container is a well known solution; however it is difficult to reliably control the temperature of the water or the level of the water around the container safely and reliably. Water evaporates during the heating and must be replaced. Also the apparatus must be adapted to be easily disassembled and cleaned to meet governmental health regulations.

OBJECTS

It is therefore an object of the present invention to provide an apparatus for the controlled heating and dispensing of a mixed liquid and solid material wherein the heater can not operate unless the water is at a predetermined level in a water jacket around a container for the material which assures that the material will be completely heated without burning. Further it is an object of the present invention to provide an apparatus which is economical to construct, safe to use and easy to clean. These and other objects will become increasingly apparent by reference to the following description and the drawings.

IN THE DRAWINGS

FIG. 1 is a perspective view of the apparatus 10 of the present invention particularly illustrating the material 101 to be heated, a water jacket 14 and a hose 16 with nozzle 18 for dispensing the material 101.

Figure 2:
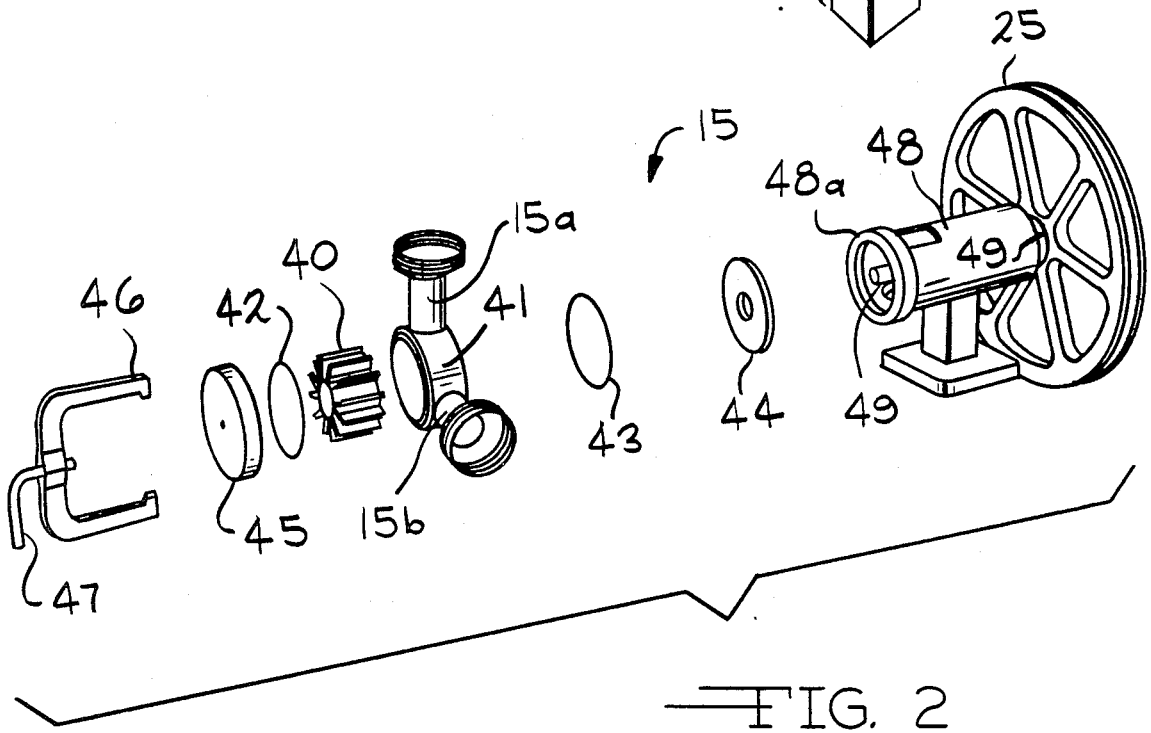

FIG. 2 is a perspective view of a conventional pump 15 for food materials which can be easily disassembled and cleaned.

Figure 3:
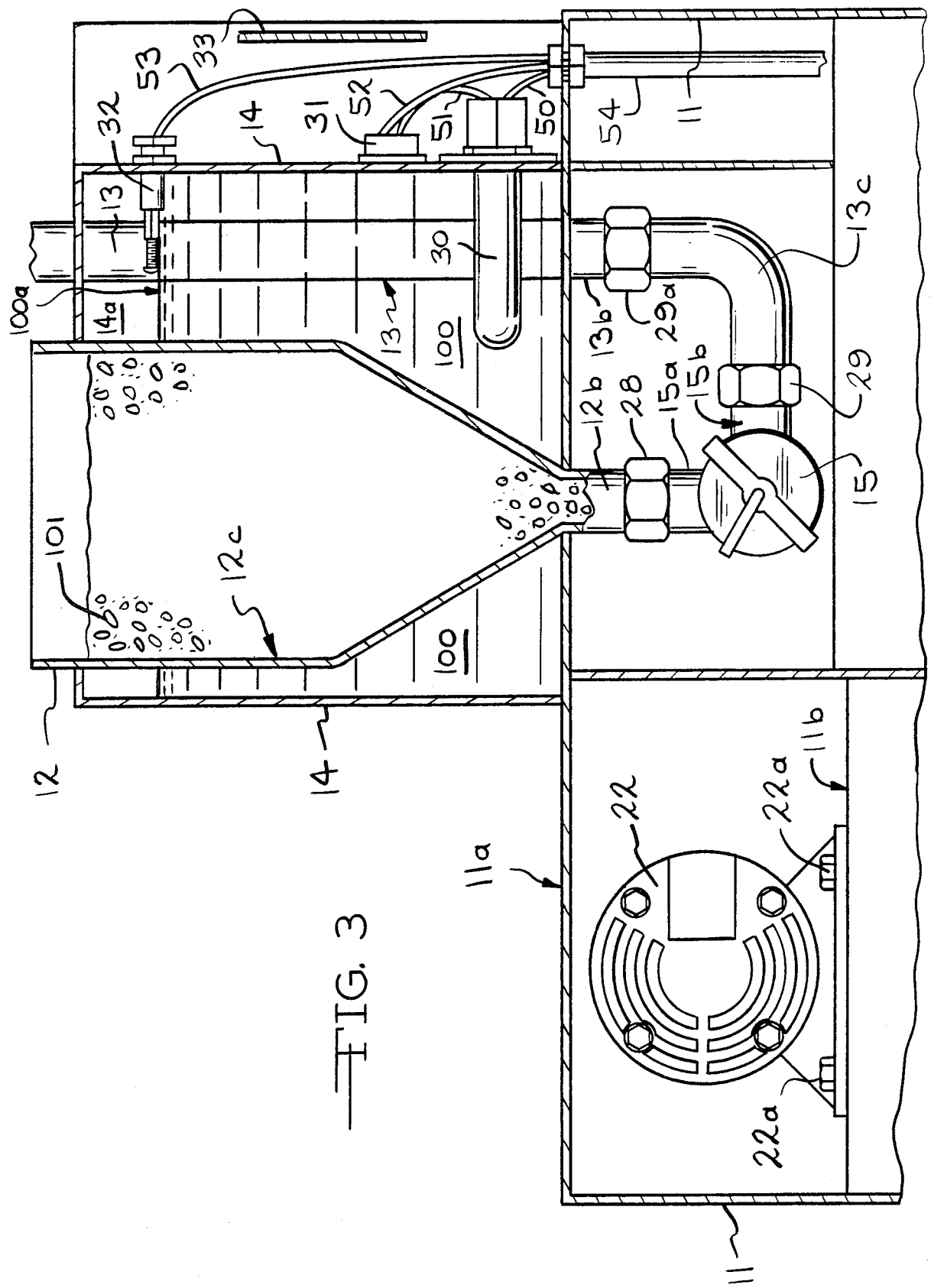

FIG. 3 is a front cross-sectional view along line 3—3 of FIG. 1 particularly illustrating the pump 15 for dispensing the material 101 through pipe 14.

Figure 4:
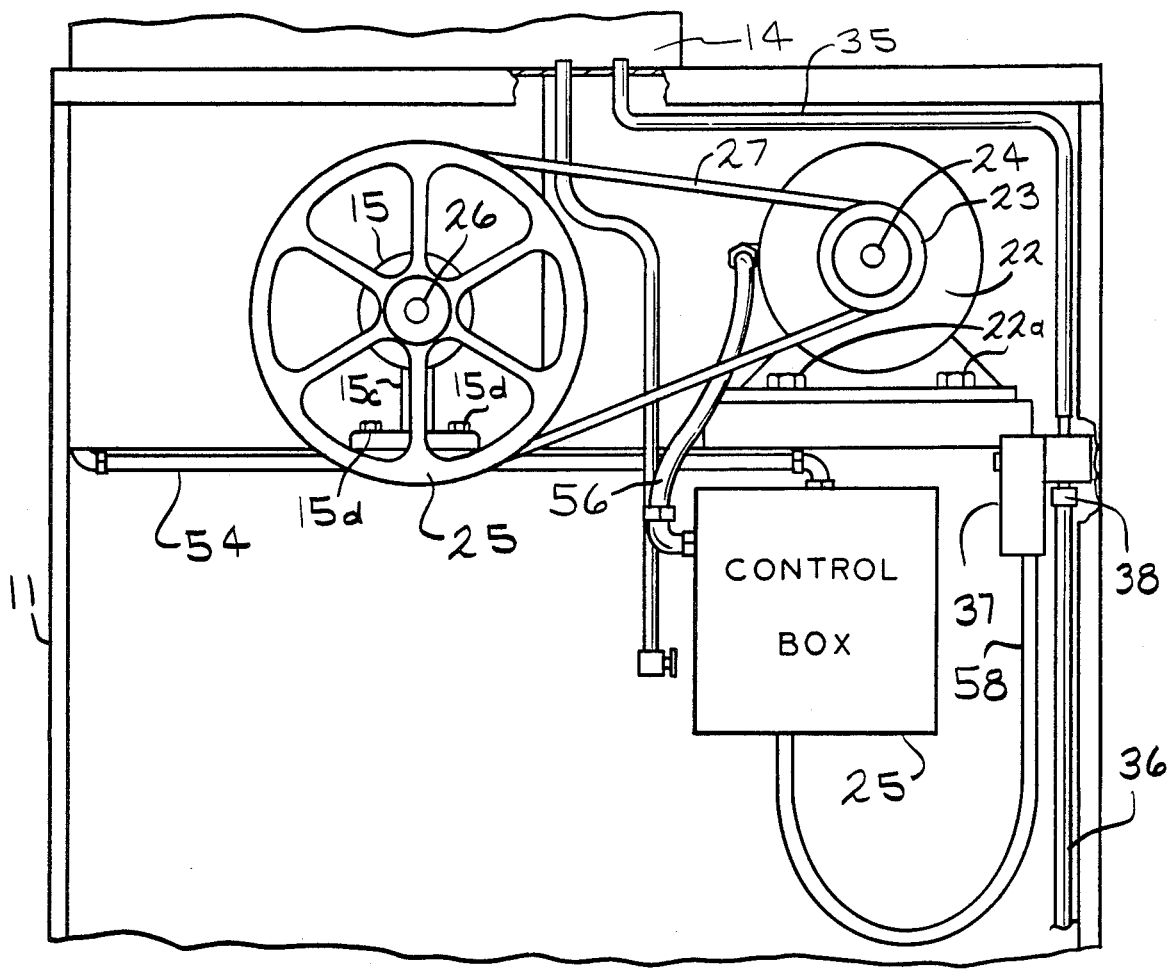

FIG. 4 is a rear view of the support structure 11 particularly illustrating the mounting of the motor 22 and pulley 23 which drives pulley 25 for pump 15 by belt 27.

Figure 5:
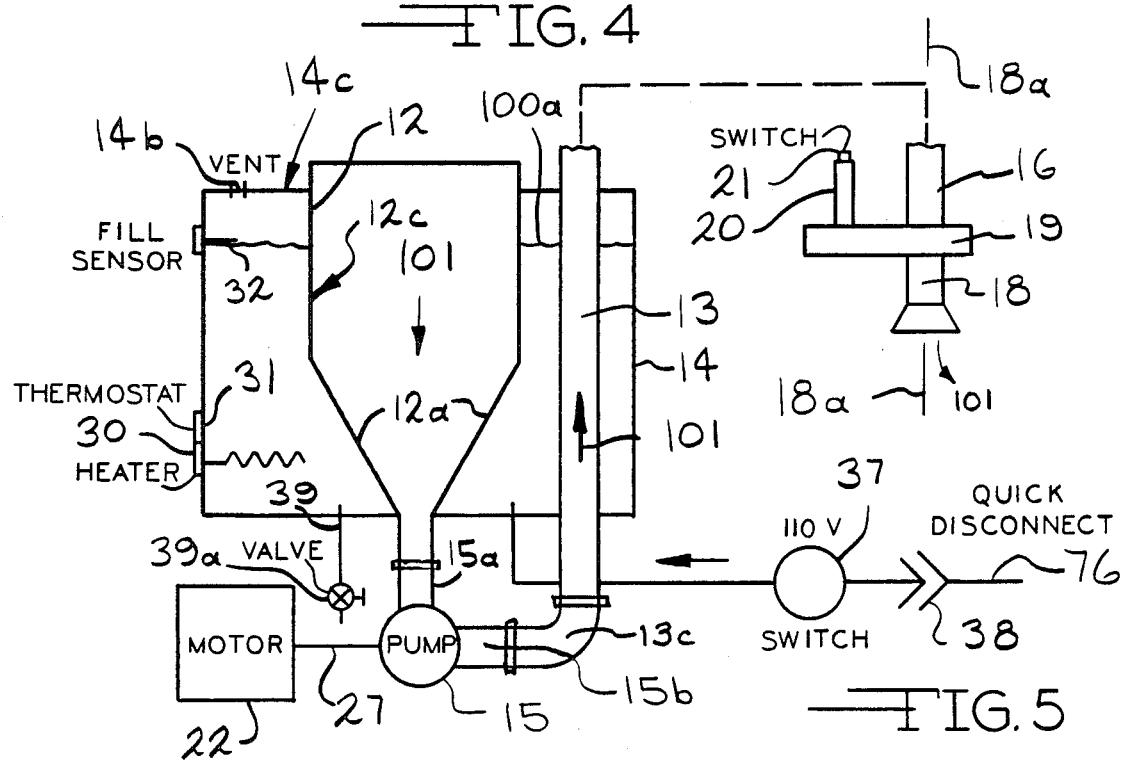

FIG. 5 is a schematic view of the water supply system to the water jacket 14.

Figure 6:
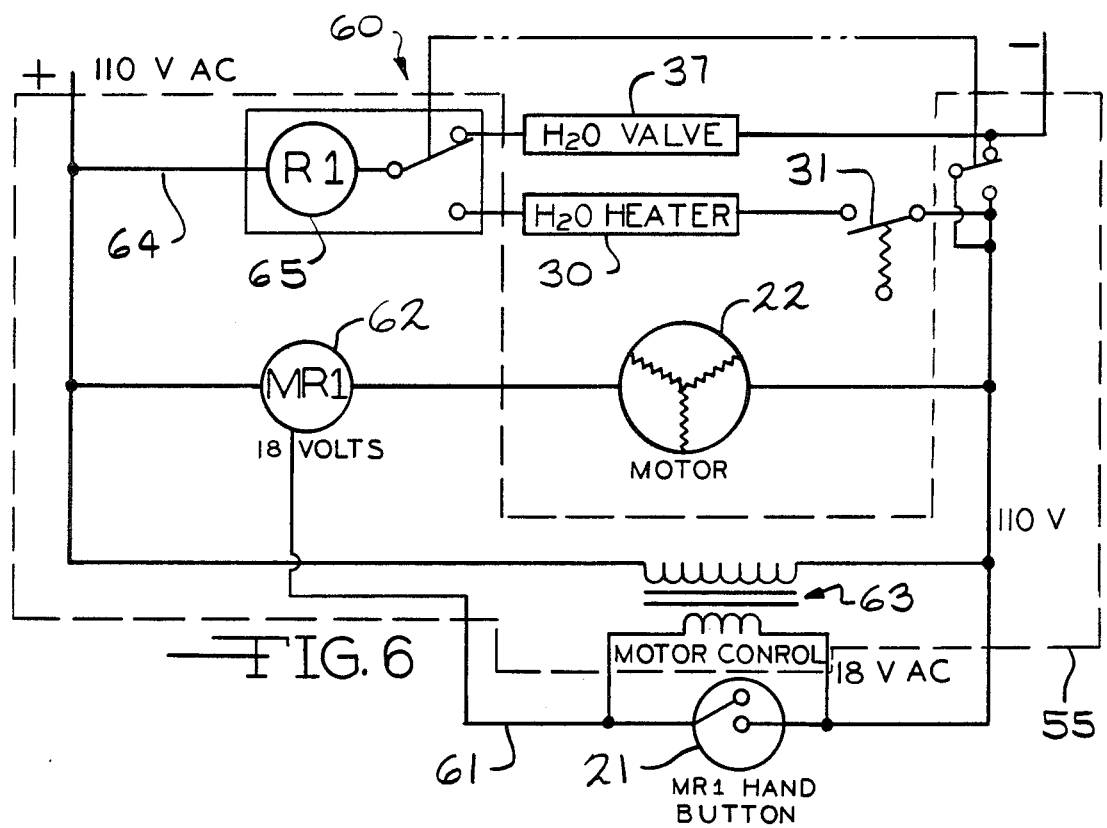

FIG. 6 is a schematic electrical diagram particularly showing motor 22, water supply valve 37 and heater 30 controlled by switch 65.

Figure 7:
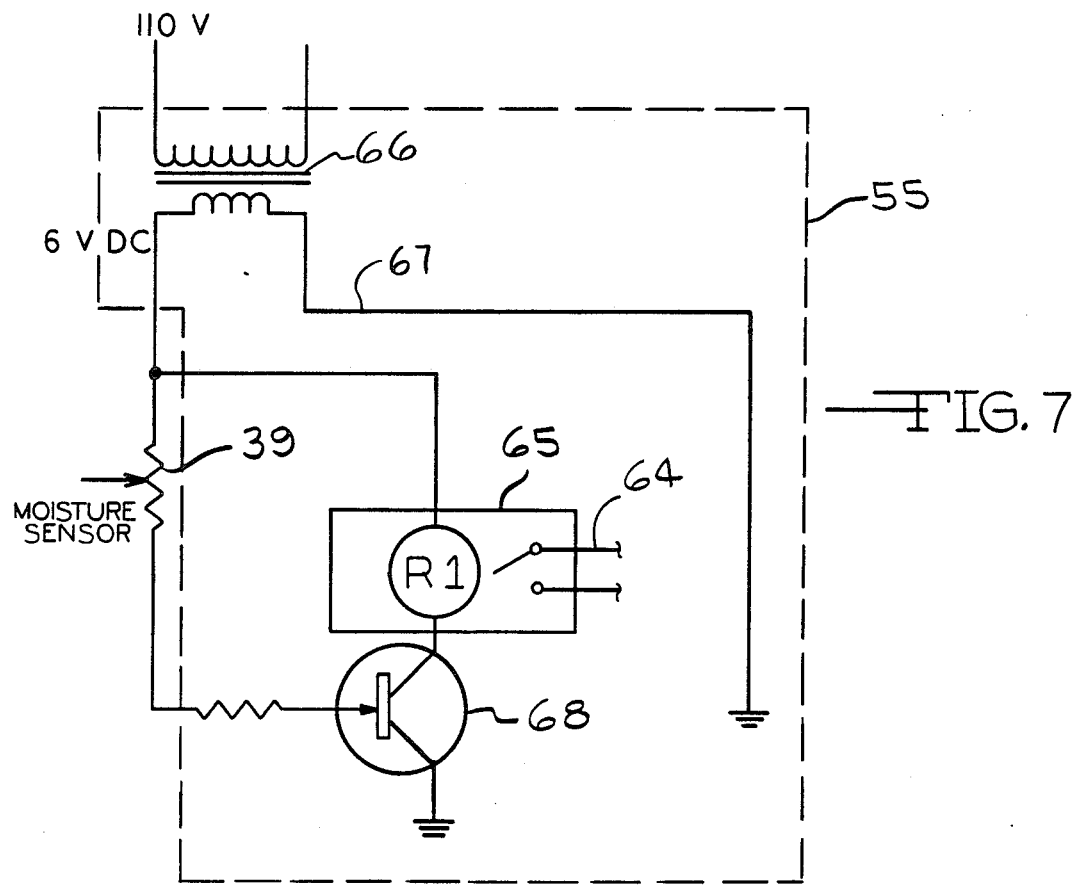

FIG. 7 is a schematic electrical diagram showing a moisture sensor 32 for controlling the double pole, double row relay or switch 65 which controls valve 37 and heater 30.

GENERAL DESCRIPTION

The present invention relates to an apparatus for heating and dispensing a food paste or other liquid and solid material including a pump means with an inlet and an outlet and driven by a motor means mounted on a support means the improvement which comprises: a reservoir means for the material mounted on the support means having an opening for filling the reservoir means above a tapered portion leading to an outlet from the reservoir means connected to the inlet of the pump means; vertically oriented pipe means connected to the outlet of the pump means and mounted adjacent to the reservoir means; water jacket means mounted on the support means around the reservoir means and the pipe means and having an inlet and an outlet for the water, wherein the outlet is at an upper portion of the reservoir means and is open during operation of the apparatus; electrically controlled valve means in fluid connection with the inlet of the jacket means and adapted to be connected to a source of supply of water; flexible hose means connected to the pipe means and leading to a nozzle means for dispensing the material; first electrically controlled switch means mounted adjacent the nozzle means which activates the motor means and thereby the pump means to dispense the material from the nozzle means; electrically controlled water means mounted inside the jacket means for heating water inside the jacket means and thus the material in the reservoir means and in the pipe means; thermostat means for controlling the temperature of the heater means and thus the temperature of the water by electrically connecting and disconnecting the heater means; electrically controlled moisture sensing means mounted inside the jacket means to sense when the jacket means is filled with water at a predetermined level above the heater means; and second electrically controlled switch means in an electrical circuit with the valve means electrically responsive to the moisture sensing means for opening the valve means to fill the jacket means with water to the predetermined level and then switching to close the valve means and allow the heater means to heat the water so long as the water is at the predetermined level and when the water drops below the predetermined level switching to fill the jacket means by opening the valve means and to disconnect the heater means.

Further the present invention relates to an apparatus for heating and then dispensing a food paste or other solid and liquid containing food material which comprises support means defining a box-like structure having an upper surface; pump means for the material with an inlet and an outlet and mounted inside the box-like structure of the support means with a rotatable impeller means for pumping the material inside a housing for the pump means mounted on a shaft which extends outside of the pump means, wherein the pump means is adapted to be easily disassembled by removing the impeller for cleaning; first pulley means defining a first plane of rotation mounted on the shaft outside of the housing; motor means with a second pulley means defining the same plane of rotation as the first pulley means mounted inside the box-like structure adjacent to the first pulley means to drive the pulley means; a belt means connecting the first and second pulley means in the plane of rotation wherein the second pulley is driven by the motor means to drive the belt means and first pulley means; reservoir means for the material mounted on the upper surface of the support means, having an opening for filling the reservoir means above a conically shaped portion with an apex of the portion leading to an outlet from the reservoir means which is connected to the inlet of the pump means; vertically oriented pipe means connected to the outlet of the pump means and mounted adjacent to the reservoir means above the surface of the support means; water jacket means mounted on the upper surface of the support means around the reservoir means and the pipe means and having an inlet and an outlet for water wherein the outlet is at an upper portion of the reservoir means, and is open during operation of the apparatus; electrically controlled valve means in fluid connection with the inlet of the jacket means, and adapted to be connected to a source of supply of water; flexible hose means connected to the pipe means and leading to a nozzle means for dispensing the material; first electrically controlled switch means mounted adjacent the nozzle means which activates the pump means to dispense the material through the nozzle means; electrically controlled water means and thereby heater means mounted inside the jacket means for heating water inside the jacket means and thus the material in the reservoir means and in the pipe means; thermostat means for controlling the temperature of the heater means and thus the temperature of the water by connecting and disconnecting thermostat means; electrically controlled moisture sensing means mounted inside the jacket means to sense when the jacket means is filled with water at a predetermined level above the heater means; second electrically controlled switch means in an electrical circuit with the valve means responsive to the moisture sensing means for opening the valve means to fill the jacket means with water to the predetermined level and switching to close the valve means and allow the heater means to heat the water so long as the water is at the predetermined level and when the water drops below the predetermined level switching to fill the jacket means with water by opening the valve means and to disconnect the heater means wherein the apparatus can be sanitized after use.

Various electrical moisture sensing means can be used to detect when the water is at the predetermined level. Preferably a device with a gap which is filled by the water to conduct electricity is used like a spark plug gap. Electrical heaters and thermostats are well known. These devices are well known to those skilled in the art.

SPECIFIC DESCRIPTION

FIGS. 1 to 7 show the apparatus 10 of the present invention. As seen in FIGS. 1, 3 and 4, a support structure 11 mounts a reservoir 12 and pipe 13 on an upper surface 11a. The reservoir 12 and pipe 13 are surrounded by a water jacket 14 provided on the upper surface 11a and has a cavity 14a for water 100. An inlet 15a of a pump 15 is connected to the reservoir 12 and an outlet 15b of the pump 15 is connected to the pipe 13. The pipe 13 preferably extends vertically straight through the water jacket 14 for ease of cleaning. A flexible hose 16 at one end 16a is connected to an upper end 13a of the pipe 13 outside of the jacket 14 by a coupling 17. At an opposite end 16b the hose 16 is connected to a nozzle 18. A post 19 extends perpendicular to a longitudinal axis 18a—18a of the nozzle 18 and supports a handle 20 parallel to the axis 18a with a manual electrical switch button 21. The handle 20 can be held with the fingers of the hand of the operator and the switch button 21 pressed with the thumb.

A motor 22 is mounted on a shelf 11b inside the support structure 11 (FIG. 4). The motor 22 has a small pulley 23 mounted on a driven shaft 24 of the motor 22. A large pulley 25 is mounted on a shaft 26 of the pump 15 which is mounted on shelf 11b in spaced relationship to the motor 22 such that the plane of rotation of the pulleys 23 and 25 are the same. A belt 27 is mounted in tension between the pulleys 23 and 25. The motor 22 is secured to the shelf 11a by bolts 22a. The switch button 21 controls the operation of the motor 22 and thus the operation of the pump 15.

As seen in FIG. 4 the reservoir 12 preferably has a tapered or conically shaped portion 12a with an apex of the portion providing an outlet 12b from the reservoir 12. The reservoir 12 preferably has a cylindrical inside part 12c above the portion 12a. Because of this construction the material 101 to be dispensed from the reservoir 12 does not lodge in the reservoir 12 and cause a problem of overheating or possible contamination of the material 101. Threaded coupling 28 is mounted between the outlet 12b of the reservoir 12 and the inlet of pump 15. Outlet 15b of pump 15 is connected by threaded couplings 29 and 29a of elbow 13c and to the inlet 13b of the pipe 13.

An electrically controlled heater 30 is provided adjacent a bottom portion of the inside of jacket 14 such that the fluid 100 can be heated. A thermostat 31 measures the temperature of the jacket 14 and controls the temperature of the water 100. An electrically controlled moisture sensor 32 establishes a predetermined level 100a of water 100 in the jacket 14. A bracket 33 is mounted on a recessed portion 14a of the jacket 14 which supports a cover 34 for the exposed portions of heater 30, thermostat 31 and moisture sensor 32. A water outlet or opening 14b is provided on the top 14c of the jacket 14. A water inlet pipe 35 (FIG. 4) leads from a water supply line 36 through an electrical control valve 37. A quick disconnect fitting 38 is provided for the water supply pipe 36. A valve 39a in line 39 at the bottom of jacket 14 allows the jacket 14 to be drained. Wires 50, 51, 52 and 53 from the heater 30, thermostat 31 and sensor 32, respectively, are interconnected as described hereinafter.

FIG. 2 shows a conventional pump 15 designed for food handling and which can be disassembled for cleaning. The pump 15 includes an impeller 40 inside a removable body 41 with seals 42 and 43 on either side. A wear plate 44 engaging seal 43 is provided inside the body 41 on which the impeller 40 rests. A cover 45 is provided to close the housing on seal 42. A clamp 46 with a threaded member 47 holds the cover 45 on seal 42 and the body 41 through seal 43 into lip 48a on housing 48. The pedestal 15c supports the pump 15 on the shelf 11a by means of bolts 15d. A rotatable shaft 49 supports pulley 25 and impeller 40.

The wires 50 to 53 shown in FIG. 3 are provided in a metal conduit 54 to a control box 55 as shown in FIG. 4. Conduit 56 carries wires from the motor 22 to the control box 55. The electrically controlled valve 37 controls the water 100 supply to the jacket 14. A metal conduit 58 carries wires from the valve 37 to the control box 55.

FIG. 5 shows the flow of the paste 101 out the nozzle by means of pump 15. The switch 21 is pressed to activate the motor 22 and thus the pump 15 by means of pulley 27. Water flows into jacket 14 through valve 37 and the level 100a is determined by the sensor 32. Unless the water is at predetermined level 100a the water is disconnected from the heater 30.

FIGS. 6 and 7 show the electrical circuit 60 for controlling the motor 22 and the valve 37 and heater 30. The dotted lines show the elements in the control box 55 in dotted lines in FIGS. 6 and 7. In FIG. 6, the motor 22 is independently controlled from a 110 VAC source of electrical power by means of circuit 61 connected to a motor relay 62. A transformer 63 steps down the 110 VAC to 18 VAC which operates the relay 62 by means of switch 21 in circuit 61. In this manner the paste 101 is dispensed through nozzle 18.

A double pole double throw switch 65 controls the operation of the valve 37 and the heater 30 and is controlled by water level sensor 32 such that the heater 30 operates only when the water is at the predetermined level 100a. The moisture sensor 32 is of the type wherein an electrical circuit is completed when the water reaches the predetermined level 100a. As a result it operates at low power requiring a step down transformer 66 which also converts the current to DC for safety reasons. Circuit 67 includes a NPN transister 68 which acts as an electronic switch to control the voltage to the relay 65. An electromechanical swtch could be used. In this manner the relay 65 allows the water jacket 14 to fill and then the heater 30 heats the water 100. When there is water 100 loss by evaporation from the jacket 14, then the heater 30 is disconnected and water 100 fills to the predetermined level 100a thus tripping the relay 65 to cause the water 100 to heat again. In this manner fool-proof operation is provided. The thermostat 31 regulates the temperature on the high side so that a temperature between about 140° F. and 170° F. is maintained.

The apparatus is particularly designed to dispense heated bean paste or frijoles for Mexican food. It can be used to dispense other heated pastes. It can be used by unskilled operators with a minimum of training.

It is intended that the foregoing description be only illustrative of the present invention and that this invention be limited only by the hereinafter appended claims.

I claim:

1. An apparatus for heating and dispensing a food paste or other liquid and solid material including a pump means with an inlet and an outlet and driven by a motor means mounted on a support means the improvement which comprises:
    (a) reservoir means for the material mounted on the support means having an opening for filling the reservoir means above a tapered portion leading to an outlet from the reservoir means connected to the inlet of the pump means;
    (b) vertically oriented pipe means connected to the outlet of the pump means and mounted adjacent to the reservoir means;
    (c) water jacket means mounted on the support means around the reservoir means and the pipe means and having an inlet and an outlet for the water, wherein the outlet is at an upper portion of the reservoir means and is open during operation of the apparatus;
    (d) electrically controlled valve means in fluid connection with the inlet of the jacket means and adapted to be connected to a source of supply of water;
    (e) flexible hose means connected to the pipe means and leading to a nozzle means for dispensing the material;
    (f) first electrically controlled switch means mounted adjacent the nozzle means which activates the motor means and thereby the pump means to dispense the material from the nozzle means;
    (g) electrically controlled heater means mounted inside the jacket means for heating water inside the jacket means and thus the material in the reservoir means and in the pipe means;
    (h) thermostat means for controlling the temperature of the heater means and thus the temperature of the water by electrically connecting and disconnecting the heater means;
    (i) electrically controlled moisture sensing means mounted inside the jacket means to sense when the jacket means is filled with water at a predetermined level above the heater means; and
    (j) second electrically controlled switch means in an electrical circuit with the valve means electrically responsive to the moisture sensing means for opening the valve means to fill the jacket means with water to the predetermined level and then switching to close the valve means and allow the heater means to heat the water so long as the water is at the predetermined level and when the water drops below the predetermined level switching to fill the jacket means by opening the valve means and to disconnect the heater means.

2. The apparatus of claim 1 wherein the pump means is in closely spaced relationship to the outlet from the reservoir means and wherein the pipe means is in closely spaced relationship to the pump means.

3. The apparatus of claim 2 wherein the pump means is adapted to be easily disassembled for cleaning.

4. The apparatus of claim 3 wherein the pump means has a housing including a C-shaped clamp with a screw holding a cover on a body of the pump, wherein the body contains an impeller means mounted on a rotatable shaft and wherein the impeller means is removable from the shaft and body upon removing the cover for cleaning.

5. The apparatus of claim 4 wherein the pump means includes couplings adjacent the inlet and outlet of the pump means for removing the body of the pump from the remainder of the housing.

6. The apparatus of claim 5 wherein the pipe passes straight through the reservoir and extends above the jacket means.

7. An apparatus for heating and then dispensing a food paste or other solid and liquid containing food material which comprises:
    (a) support means defining a box-like structure and having an upper surface;
    (b) pump means for the material with an inlet and an outlet and mounted inside the box-like structure of the support means with a rotatable impeller means for pumping the material inside a housing for the pump means mounted on a shaft which extends outside of the pump means, wherein the pump means is adapted to be easily disassembled for cleaning;
    (c) first pulley means defining a first plane of rotation mounted on the shaft outside of the housing;
    (d) motor means with a second pulley means defining the same plane of rotation as the first pulley means mounted inside the box-like structure adjacent to the first pulley means;

(e) a belt means connecting the first and second pulleys means in the plane of rotation, wherein the second pulley is driven by the motor means to drive the belt means and first pulley means to drive the pump means;

(f) reservoir means for the material mounted on the upper surface of the support means, having an opening for filling the reservoir means above a conically shaped portion with an apex of the portion leading to an outlet from the reservoir means which is connected to the inlet of the pump means;

(g) vertically oriented pipe means connected to the outlet of the pump means and mounted adjacent to the reservoir means above the surface of the support means;

(h) water jacket means mounted on the upper surface of the support means around the reservoir means and the pipe means and having an inlet and an outlet for water wherein the outlet is at an upper portion of the reservoir means and is open during operation of the apparatus;

(i) electrically controlled valve means in fluid connection with the inlet of the jacket means and adapted to be connected to a source of supply of water;

(j) flexible hose means connected to the pipe means and leading to a nozzle means for dispensing the material;

(k) first electrically controlled switch means mounted adjacent the nozzle means which activates the pump means to dispense the material through the nozzle means;

(l) electrically controlled heater means mounted inside the jacket means for heating water inside the jacket means and thus the material in the reservoir means and in the pipe means;

(m) thermostat means for controlling the temperature of the heater means and thus the temperature of the water by connecting and disconnecting the heater means;

(n) electrically controlled moisture sensing means mounted inside the jacket means to sense when the jacket means is filled with water at a predetermined level above the heater means; and (o) second electrically controlled switch means in an electrical circuit with the valve means responsive to the moisture sensing means for opening the valve means to fill the jacket means with water to the predetermined level and then switching to close the valve means and allow the heater means to heat the water so long as the water is at the predetermined level and when the water drops below the predetermined level switching to fill the jacket means with water by opening the valve means and to disconnect the heater means wherein the apparatus can be sanitized after use.

8. The apparatus of claim 7 wherein couplings are provided adjacent the inlet and outlet of the pump means for removing the housing from the support means.

9. The apparatus of claim 7 wherein the housing of the pump means includes a C-shaped clamp with a screw holding an end covers on a body of the pump means which are removable from the shaft and wherein the impeller means is removable from the body and shaft when the cover is removed.

10. The apparatus of claim 7 wherein the jacket means has a manually operated valve means which allows the jacket means to be drained of water after use of the apparatus.

11. The apparatus of claim 7 wherein the apparatus can be maintained at a temperature between about 140° and 170° F. by the electric heater means.

12. The apparatus of claim 11 wherein the first pulley means is larger in diameter than the second pulley means so that the speed of the first pulley means is reduced relative to slow the rotation of the impeller means.

13. The apparatus of claim 7 wherein the second switch means is a double pole double throw switch.

14. The apparatus of claim 13 wherein the moisture sensing means is a ceramic insulated water sensing electrode means.

15. The apparatus of claim 7 wherein the motor means is powered by 110 VAC, wherein the second switch means is a solenoid controlled double pole double throw switch in the electrical circuit means with the valve means and the heater means and wherein the switch means is activated to turn on the heater means or the valve means by a low voltage circuit including the moisture sensor means.

16. The apparatus of claim 13 wherein an amplifier means in the low voltage circuit increases the voltage from the moisture sensor means to activate the switch means.

17. The apparatus of claim 7 wherein the amplifier means is an NPN transistor.

18. The apparatus of claim 17 wherein moisture sensor means is powered by direct current in the low voltage circuit.

19. The apparatus of claim 7 wherein the first and second switch means are each mounted in a single control box inside the support means.

20. The apparatus of claim 7 wherein the flexible hose means is secured to the pipe means and to nozzle means at opposite ends by screw clamp means.

21. The apparatus of claim 7 wherein material is dispensed through the nozzle means which has an elongate narrow opening so that the paste is dispensed as a ribbon.

22. The apparatus of claim 7 wherein the reservoir means has a cylindrical portion on an inside part of the reservoir means containing the material and the conically shaped portion below the cylindrical portion.

23. The apparatus of claim 7 wherein the pipe means passes straight through the reservoir and extends above the jacket means.

24. The apparatus of claim 7 wherein water supply is provided with a quick disconnect fitting.

* * * * *